United States Patent [19]

Ault et al.

[11] 4,439,241

[45] Mar. 27, 1984

[54] CLEANING PROCESS FOR INTERNAL PASSAGES OF SUPERALLOY AIRFOILS

[75] Inventors: Earle A. Ault, South Windsor; Charles E. Bevan, Manchester, both of Conn.

[73] Assignee: United Technologies Corporation, Hartford, Conn.

[21] Appl. No.: 353,764

[22] Filed: Mar. 1, 1982

[51] Int. Cl.$^3$ ............................................. B08B 3/08
[52] U.S. Cl. ............................ 134/22.17; 134/22.18; 134/29; 134/30
[58] Field of Search ............... 134/2, 22.12, 22.13, 134/29, 30, 22.17, 22.18

[56] References Cited

U.S. PATENT DOCUMENTS

| | | | |
|---|---|---|---|
| 3,121,026 | 2/1964 | Beigay et al. | 134/2 |
| 3,126,301 | 3/1964 | Faler | 134/2 X |
| 4,073,662 | 2/1978 | Borom | 134/2 |
| 4,134,777 | 1/1979 | Borom | 134/2 |
| 4,317,685 | 3/1982 | Ahuja et al. | 134/2 |

*Primary Examiner*—Richard V. Fisher
*Attorney, Agent, or Firm*—C. G. Nessler

[57] ABSTRACT

Residues accumulated during use are removed from the small interior cavities of superalloy airfoils by a process which includes exposing the interior of the part to an aqueous solution of 20–45% potassium hydroxide at a pressure of 10.4–24 kPa (150–350 psi) and temperature of 150°–235° C. (300°–450° F.) for about 20 hours, followed by water blasting using a pressure greater than about 14 MPa (2,000 psi). Unless the part is kept continuously wet between the first and second steps, the second step will not be effective.

3 Claims, No Drawings

CLEANING PROCESS FOR INTERNAL PASSAGES OF SUPERALLOY AIRFOILS

DESCRIPTION

1. Technical Field

The present invention relates to the repair of superalloy gas turbine parts, specifically to the chemical cleaning of internal passages on such parts.

2. Background

Many airfoil components, such as gas turbine engine blades and vanes, are subjected to extremely high temperatures during operation. For this reason, they are constructed of superalloys and are cooled by air ducted through internal passages. After prolonged use in an engine, there is inevitable wear of the components, and because of their high cost, refurbishment is commonly undertaken.

Refurbishment can involve various steps, depending on the nature of the component degradation. But one of the prevalent steps is that the parts be externally recoated; and this involves exposure to high temperature in the range of 1080° C. Parts are also often subjected to internal recoating, at like temperatures. From a metallurgical standpoint, it is very important that there not be any adverse contamination of the component material during such processing. For this reason, it is necessary to clean the internal passages of parts, to remove deposits of foreign material from the internal passages. The nature of these deposits varies with the environments to which an engine has been exposed, during use. Very generally, the deposits will be oxides and carbonaceous compounds. Experience shows that unless such residues are removed, there is the risk that they will interact with the metal of the blade, and thereby form regions having degraded properties. Consequently, an early step in the refurbishment of gas turbine airfoils is to clean the internal passages. Since the passages are usually very small and twisted, it is very difficult to gain access to them.

One of the more favored methods for cleaning the passages in the past has been to use grit blasting, and this has usually necessitated removing the tip of the airfoil to provide better access. But, access from the tip still is not entirely adequate and some internal areas will remain uncleaned. There is also the risk that sand particles will remain entrapped in the smaller passages, and welding of a new tip is inherently costly and undesirable from the standpoint of weld cracking and so forth.

Blades which are subjected to the highest service temperatures have nickel aluminum type coatings on their internal as well as external surfaces. Oftentimes, it is found that the internal coating is not in need of repair, and therefore any cleaning procedure should not lead to unwanted costs in replacing the internal coating. Grit blasting is undesirable in this respect as well.

DISCLOSURE OF INVENTION

An object of the invention is to provide a process which is able to economically remove deposits of varied composition from inaccessible areas of gas turbine blades and the like, without attacking or damaging the coatings or base metal of the articles.

According to the invention, the internal passages of an article are cleaned in a two step procedure. In the first step, the article is subjected to an alkaline corrosive at an elevated temperature and pressure. In the second step the article is subjected to flushing with water, using pressures greater than about 14 MPa (2,000 psi). In addition, the part must be kept in an aqueous solution, without allowing any drying, between the first and second steps. Preferably, the part is contacted with a solution of 45 weight percent potassium hydroxide, at a temperature of about 220° C., and a pressure of 13.8 kPa (200 psi) for about 24 hours.

It is found that the foregoing procedure is effective in removing most deposits. The first step appears to soften up the deposits, and the second step mechanically removes the deposits, even from blind cavities. Provided the time of exposure to the caustic solution is limited, there is no deleterious effect of the process on the internal coatings or base metal.

The foregoing and other objects, features and advantages of the present invention will become more apparent from the following description of preferred embodiments.

BEST MODE FOR CARRYING OUT THE INVENTION

The preferred embodiment of the invention is described in terms of the cleaning of a high pressure turbine blade such as shown in U.S. Pat. No. 4,278,400 to Yamarik et al. The blade will be made of a nickel base superalloy, such as one made of MAR M-200+Hf (by weight percent 9 Cr, 10 Co, 2 Ti, 5 Al, 12.5 W, 1 Cb, 0.15 C, 0.015 B, 0.05 Zr, 1.15 Hf, balance Ni) or B-1900+Hf (8 Cr, 10 Co, 1 Ti, 6 Al, 6 Mo, 4.3 Ta, 0.11 C, 0.07 Zr, 0.015 B, 2 Hf, balance Ni), and will have an internal coating of about 0.013–0.09 mm thick nickel aluminide, such as is obtained by a common gas phase or pack cementation aluminizing process. The invention is useful with the single crystal alloys disclosed in U.S. Pat. Nos. 4,209,348 and 4,222,794 and will be generally applicable for other kinds of components made of superalloys based on nickel, cobalt and iron, and having various coatings.

The present invention is part of the total process of repairing a gas turbine blade which generally entails the following steps: cleaning the part, including the use of the present invention; stripping the old external coating from the part; repairing the part as needed, by welding, straightening, and other manufacturing processes; and, reapplying the external coating. In some instances the internal coating is removed and the part is recoated internally, as well as externally.

The composition and character of deposits which are found on the insides of turbine blades will vary considerably. Some of them will tend to collect or absorb fluids which will by themselves, or by combining with chemicals in the debris, cause corrosion of the internal coating or base metal during the aforementioned processing. In addition, when parts are to be internally recoated, the presence of debris inside the passages will physically prevent restoration of an internal coating of full integrity.

The exact source of the deposits accumulated during engine use can only be speculated upon. Analysis has shown that the most frequent component of deposits is silica, although calcium sulfate is often present. X-ray diffraction analyses show frequently that various complex silicates and sulfates are present. The elements Na, Mg, Fe, Sn, Mn and Zr have also been found, often in significant quantity. Numerous other elements have been found present in minor and trace amounts. In summary, it is impossible to exactly characterize what the composition of the deposits is. The physical character of the deposits varies as well; deposits which are partially fused agglomerations of particulates tend to be common; some deposits appear substantially vitreous. They tend to be well-adhered to the superalloy blades, and difficult to remove; in some instances there might be some bonding between the deposit and the normal oxidized surface of the blade interior.

Because of the varied nature of the deposits, it is not obvious that any particular chemical solution will attack the deposits, sufficient to remove them, without attacking the metal interior of the blade. Of course, it has been known that certain ceramic materials can be attacked chemically by alkaline solutions. For instance, silica-containing cores of zircon, alumina, etc., used in the casting processes for making gas turbine blades are removed by autoclaving in a solution of potassium hydroxide. However, it is also well known that the composition and physical character of the cores must be controlled, so that they are able to be removed. If they have too high a density, or if the composition is not controlled satisfactorily, then the autoclaving process is found ineffective. For cores which are useful, the autoclaving step entirely removes the core, and only flushing is used to remove any insoluble debris which may lie within the airfoil.

We have now discovered that autoclaving is useful, if it is combined with the other steps we set forth herein. To process a part in accord with our invention, we first remove any baffles or any other obstructions at the exterior, usually the root, where cooling air is normally injected. Then, we dispose the blade in a holder, and place the holder in an autoclave or pressure vessel, so that the length of the blade is vertical. This allows fluids to move freely through the part by convection and avoids gases being trapped in a blind cavity. The blade is then immersed in an alkaline solution of potassium hydroxide (KOH) and water. The solution may range by weight percent between 10–45 KOH, and is preferably 45 weight percent. If the solution is to dilute, the time of processing becomes too long and thus we prefer the higher concentration. The part is subjected to the solution at a temperature of 150°–235° C., preferably 205°–235° C. Lower temperatures provide too low a rate of reaction while higher temperatures lead to attack of the blade. The pressure is not critical between 10.4–24 kPa (150–350 psi), and is preferably 13.8 kPa (200 psi). The higher pressure speeds the rate of reaction, and the minimum is necessary to prevent vaporization and loss of the solution from the vessel, and to cause the solution to penetrate the deposits. Higher pressures may be used, but we have not found them to be particularly advantageous.

Agitation of the solution is desirable during processing, and means for moving the parts or stirring the solution may be used. The autoclaving step may be conducted for up to 120 hours. Our experience has shown that after 24 hours the deposits will be sufficiently altered, using the preferred conditions, to enable their removal in the subsequent processing. Long exposure time is undesirable because it risks attack of the article.

At the completion of the autoclaving time, the parts are removed from the potassium hydroxide solution and washed with ordinary water. We have discovered that it is necessary after autoclaving to keep the parts in an aqueous environment, until removal of the deposits can be accomplished by our pressure blasting step. If the blades are allowed to dry, it is as if the autoclaving step has not been accomplished at all, at least insofar as our second step is concerned. The easiest procedure is to keep the parts immersed in water. However, other techniques such as storing in an environment of 100% relative humidity will be satisfactory as well. When the parts are stored in a moisture laden environment, the time until the performing of the second step is not critical.

In the second step, water at room temperature and a pressure of at least 14 MPa (2,000 psi), preferably 28–69 MPa (4,000–10,000 psi), is directed at the airfoil. Typically, it is satisfactory to have a nozzle and direct the nozzle at the various openings in the airfoil. However, it will often be just as satisfactory to mount the part in a fixture to which the high pressure water is supplied, and to cause the high pressure water to flow through the blade in the same manner as the cooling air does. The force of the high pressure water will physically remove the debris inside the passages. Our experiments have shown that in the absence of the high pressure water step, the debris will not be removed after autoclaving and flushing of the kind associated with core removal, such as with water of about 14 kPa or lower. In the pressure blasting step, we use water because of its low cost. Of course, other liquids would carry out the invention as well. In important respects our use of high pressure fluid blasting is not simple substitution of one known cleaning process for another. The success of our invention is based on the use of a liquid, with about the density of water or greater, and free of any abrasive particles. It is the use of a heavy fluid which transmits great force in different directions, which enables cleaning of the hidden interstices. Air by itself would not work, and the sand particulate has relatively little forceful acceleration by the air conveying medium, once it issues from the grit blast nozzle. At the same time, the lack of abradability of our medium means that it will not wear away the interior metallic coatings and surfaces.

After the second step, the part is essentially complete. However, a good practice is to check the airfoil to be sure that all the passages are open. This can be accomplished by applying water to the cooling air inlet of the part and observing the flow characteristics where the water issues from the part, typically at the trailing edge of the airfoil. If irregularities are noticed, it would indicate that there is a physical blockage inside the blade, and it must be reprocessed in the context of our invention, or other means—usually mechanical—must be used in an attempt to clean the part.

An additional check on whether residues are present in the part is to monitor the conductivity of water which issues from the part, compared to the conductivity of the water before it is put in the part. If there is residual debris inside the part, it will usually have retained some of the caustic solution. The flowing water will pick up slight amounts of this, and they may be detected according to their effect on the conductivity of the water.

Lastly, the parts are air dried, and then they are subjected to the other processing steps necessary in their refurbishment.

Although this invention has been shown and described with respect to a preferred embodiment, it will be understood by those skilled in the art that various changes in form and detail thereof may be made without departing from the spirit and scope of the claimed invention.

We claim:

1. The method for removing deposits from interior cavities of a component made of superalloy, comprising the steps of contacting the interior of the component with an aqueous solution of 20–45 weight percent alkaline corrosive at a pressure of 10.4–24 kPa (150–350 psi) and a temperature of 150°–235° C. (300°–450° F.) to soften the deposits without significantly attacking the superalloy; removing the component from contact with the aqueous solution, thereby leaving some of the softened deposits physically intact within the interior cavities; impinging on said deposits a flowing stream of liquid at a pressure of at least 13.8 MPa (2,000 psi), to physically remove the deposits; and wherein the component is contacted with an aqueous environment to prevent drying of the softened deposits between the time of removal of the component from said aqueous solution and the time of impinging said flowing stream of liquid on the softened deposits.

2. The method of claim 1 characterized by a first step temperature of 205°–235° C. (400°–450° F.), and a second step pressure of about 28–69 MPa (4,000–10,000 psi).

3. The method of claim 1 characterized by the use of KOH as the alkaline corrosive.

* * * * *